United States Patent [19]

Hishinuma et al.

[11] Patent Number: 4,683,377
[45] Date of Patent: Jul. 28, 1987

[54] SUBTRACTION PROCESSING METHOD AND APPARATUS FOR RADIATION IMAGES

[75] Inventors: Kazuhiro Hishinuma; Akihiro Ohga, both of Kanagawa, Japan

[73] Assignee: Fuji Photo Film Co., Ltd., Japan

[21] Appl. No.: 511,026

[22] Filed: Jul. 5, 1983

[30] Foreign Application Priority Data

Jul. 5, 1982 [JP] Japan ................................. 57-116457

[51] Int. Cl.$^4$ ............................................... G03C 5/16
[52] U.S. Cl. ................................ 250/327.2; 250/484.1
[58] Field of Search ............... 250/327.2, 484.1, 491.1, 250/252.1; 364/163, 414; 378/62

[56] References Cited

U.S. PATENT DOCUMENTS 3,854,049 12/1974 Mistretta et al. ...................... 378/62
4,276,473 6/1981 Kato et al. ........................... 250/337
4,327,292 4/1982 Wang et al. ...................... 250/491.1

Primary Examiner—Janice A. Howell
Attorney, Agent, or Firm—Sughrue, Mion, Zinn, Macpeak, and Seas

[57] ABSTRACT

Markers for providing reference points or lines are recorded together with radiation images in stimulable phosphor sheets in a position fixed with respect to the radiation images. The stimulable phosphor sheets are scanned with stimulating rays, and the spatial coordinates of the reference points or lines are detected from light emitted from the stimulable phosphor sheets. The stimulable phosphor sheets are moved with respect to scanning lines of stimulating rays based on the detected spatial coordinates to adjust the spatial coordinates to a spatial coordinate predetermined with respect to the scanning lines of stimulating rays. Then, the radiation images are read out.

8 Claims, 11 Drawing Figures

SUBTRACTION PROCESSING METHOD AND APPARATUS FOR RADIATION IMAGES

BACKGROUND OF THE INVENTION

1. Field of the Invention

This invention relates to a subtraction processing method for radiation images and an apparatus for carrying out the method. More particularly to a subtraction processing method in a radiation image recording and reproducing method comprising the steps of exposing the stimulable phosphor sheet carrying a radiation image stored therein to stimulating rays to sequentially release the radiation energy stored in the stimulable phosphor sheet as light emission, photoelectrically reading out the emitted light by use of a photodetector, and reproducing the obtained image signal as a visible image, and an apparatus for carrying out the method.

2. Description of the Prior Art

When certain kinds of phosphors are exposed to a radiation such as X-rays, $\alpha$-rays, $\beta$-rays, $\gamma$-rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and read-out system. Specifically, the stimulable phosphor formed on a sheet is first exposed to a radiation transmitting through an object to have a radiation image stored therein, and is then scanned with stimulating rays such as laser beam which causes it to emit light in the pattern of the stored image. The light emitted from the stimulable phosphor sheet upon stimulation thereof is photoelectrically detected and converted to an electric image signal, which is processed as desired to reproduce a visible image on a recording medium such as photographic light-sensitive material or on a display such as cathode ray tube (CRT).

This radiation image system using the stimulable phosphor sheet is advantageous over the conventional radiography using a silver halide photographic material in that the image can be recorded over a very wide range (latitude) of radiation exposure and further in that the electric signal used for reproducing the visible image can be freely processed to improve the image quality for viewing, particularly diagnostic purposes. In more detail, since the amount of light emitted upon stimulation after the radiation energy is stored in the phosphor varies over a very wide range in proportion to the amount of energy stored therein, it is possible to obtain an image having desirable density regardless of the amount of exposure of the phosphor to the radiation by reading out the emitted light with an appropriate read-out gain and converting it to an electric signal to reproduce a visible image on a recording medium or a display. The electric signal may further be processed as desired to obtain a radiation image suitable for viewing, particularly diagnostic purposes. This is very advantageous in practical use.

As mentioned above, in the radiation image system using a stimulable phosphor, deviation of the level of the radiation energy stored in the stimulable phosphor from a desired level can easily be compensated by setting the read-out gain to an appropriate value when photoelectrically reading out the light emitted from the stimulable phosphor upon stimulation thereof. Therefore, the quality of the reproduced radiation image is not adversely affected by a change in radiation dose due to fluctuating tube voltage or MAS value of the radiation source, a variation in the sensitivity of the stimulable phosphor or the photodetector, a change in radiation dose according to the condition of the object, or a change in the radiation transmittance according to the object etc. Further, it is possible to obtain a desirable radiation image even when the radiation dose to the object is reduced. Further, it is possible to obtain a radiation image having high image quality of high contrast, high sharpness and low noise etc. by once converting the light emitted from the stimulable phosphor into an electric signal, and processing the electric signal as desired. Particularly, when the radiation image is used for medical diagnosis, it is possible to obtain a radiation image processed in accordance with a desired portion of a human body such as the heart, the chest etc. and improve the diagnostic efficiency and accuracy.

There has heretofore been known a subtraction processing method wherein an image of a specific structure (for example, an organ, the bone, the blood vessel, or the like) of human body is extracted by use of two or more X-ray photographic films to correctly diagnose the specific structure. In general, the known subtraction processing method is classified into the so-called temporal (time difference) subtraction processing method and the so-called energy subtraction processing method. In the former method, an image of a specific structure is extracted by subtracting the digital image signal of an X-ray image obtained without injection of contrast media from the digital image signal of an X-ray image in which the image of the specific structure is enhanced by the injection of contrast media. In the latter method, an object is exposed to X-rays having energy distributions different from each other to obtain two X-ray images respectively containing the images of a specific structure recorded on the basis of the intrinsic X-ray energy absorption characteristics of the specific structure. Then, each X-ray image is weighted appropriately, and subjected to subtraction to extract the image of the specific structure.

However, the aforesaid subtraction processing method using the X-ray photographic films is disadvantageous in that, since the X-ray photographic films generally exhibit non-linear gradation and a narrow latitude of exposure, it is impossible to obtain a subtraction image of high quality. Further, in this conventional subtraction processing method using the X-ray photographic films, one X-ray image is inverted, two X-ray photographic films are manually superposed one upon the other, and the subtracted image is recorded on a third photographic film. Therefore, it is not always possible to correctly superpose the X-ray images recorded on the two X-ray photographic films one upon the other and remove images other than the structure to be diagnosed, and it is very troublesome to match the positions of the X-ray photographic films to each other. Accordingly, the aforesaid subtraction processing method using the X-ray photographic films is not always effective for diagnosis, and has not been used widely, except for a particular use.

Recently, the so-called digital subtraction processing method or digital radiography (hereinafter referred to as "DR") has attracted attention since, if the image data is a digital value, subtraction can be conducted by a linear computer processing without using the troublesome, non-linear photographic subtraction technique. As the DR, there have heretofore been known digital fluoroscopy wherein the output of an X-ray fluoroscopic camera comprising an image intensifier tube (I.I. tube) and a television camera is digitally processed, and scanned projection radiography utilizing the X-ray detecting system of computed tomography, such as Xe detector. The subtraction image obtained by DR is particularly advantageous over the subtraction image obtained by use of the conventional X-ray photographic films in that subtraction can be electrically conducted by digital processing. However, the DR presents a problem that the spatial resolution of the subtraction image obtained by use of the DR generally depends on the resolution of the X-ray image detector such as I.I. tube, Xe detector, or the like, and that the spatial resolution of the subtraction image becomes lower than that obtained by the conventional method using the X-ray photographic films, making it impossible to sufficiently accurately diagnose a specific structure. Further, since the recording range in the DR is limited by the light receiving area of the X-ray image detector such as I.I. tube, Xe detector, or the like, the DR presents another problem that it is impossible to obtain a subtraction image of a wide range of portion of the human body at one time.

Also in the aforesaid radiation image system using a stimulable phosphor sheet, it is possible to conduct various digital processings since a final radiation image can be reproduced on various output devices after reading out a radiation image once stored in the stimulable phosphor sheet by use of stimulating rays, detecting the light emitted from the stimulable phosphor sheet upon stimulation thereof by a photodetector, converting the thus detected electric signal into a digital signal, and processing the signal in various ways. Namely, if said radiation image system utilized for the subtraction processing, it is possible to obtain the advantage of the aforesaid DR, i.e. the advantage that it is possible to conduct a digital processing. Further, said radiation image system can provide an image having markedly higher spatial resolution compared with the conventional DR since it is possible to decrease the beam diameter of the stimulating rays (laser beam) employed for scanning the stimulable phosphor sheet, increase the number of picture elements per unit area, and directly record the final output of the image data obtained by the subtraction processing and various image processings on a light-sensitive material such as silver halide photographic material. Therefore, theoretically, it is possible to obtain a sharp subtraction image having a spatial resolution higher than visual resolution of human eyes. Further, since there is no technical obstruction to make and use the larger size of the stimulable phosphor sheet, it is possible to obtain at one time a subtraction image over a large area covering a wide range of portion of the human body. Thus, the radiation image system using a stimulable phosphor sheet has many important features that the conventional DR does not possess.

However, experiments conducted to obtain a subtraction image in the aforesaid radiation image system using a stimulable phosphor sheet revealed the problems described below.

Namely, when a subtraction image is obtained in the radiation image system using a stimulable phosphor sheet, two stimulable phosphor sheets (in some cases, three or more stimulable phosphor sheets) are sequentially or simultaneously inserted into an image recording table, radiation images to by subtraction processed are recorded on the stimulable phosphor sheets, the stimulable phosphor sheets carrying the radiation images stored therein are then inserted one by one into an image read-out apparatus, and the radiation images to be subtraction processed are read out from the stimulable phosphor sheets. During this course, even when the recording and the read-out are conducted very carefully, a shift and a rotation occur between the images to be subtraction processed. As a result, an image to be erased in the subtraction processing is not erased, or an image to be extracted is erased to develop an artifact. In this case, therefore, a correct subtraction image cannot be obtained, and a very real problem is presented with respect to diagnosis.

In the radiation image system using a stimulable phosphor sheet, a radiation image is stored as a latent image in the stimulable phosphor sheet. Therefore, when a deviation occurs between the radiation images stored in the stimulable phosphor sheets, the two X-ray images cannot be visually matched to each other, and it is not always possible to correct the deviation, differently from the case of X-ray photographic films on which X-ray images are recorded as visible images.

Further, even when the shift and the rotation between the two radiation images can be detected by use of some means, much time is required for the conventional operation processing to be conducted to correct the detected data of the radiation images, particularly in the case of correction of the rotation. This is a very real problem in practical use.

To solve the above problem, it has been proposed in European patent application No. 83 102787.5 to employ a subtraction processing method for radiation images comprising the steps of (i) when each radiation image to be subtraction processed is recorded on each stimulable phosphor sheet, simultaneously recording a marker for providing a reference point or a reference line to said stimulable phosphor sheet, (ii) detecting the spatial coordinate of said reference point or said reference line from the digital image signals of said image detected from said stimulable phosphor sheet, (iii) conducting the aforesaid steps for two or more radiation images to be subtraction processed, (iv) calculating the rotation and the shift among said two or more radiation images based on the detected spatial coordinates, (v) digitally rotating and/or moving either one of said radiation images to be subtraction processed based on the calculated rotation and the calculated shift,and, then conducting a subtraction processing of the image signals among the corresponding picture elements of said two or more radiation images. The term "shift" as used herein means a longitudinal deviation or a transverse deviation of the radiation image or an object with respect to the stimulable phosphor sheet.

The aforesaid subtraction processing method can automatically correct the shift and rotation occurring among the radiation images stored in the stimulable phosphor sheets. Accordingly, this method can provide a subtraction image which exhibits high contrast resolution and high spatial resolution and which is free of any artifact and very suitable for viewing, particularly for diagnostic purposes.

Further, when combined with the approximate rotation operation as described in European patent application No. 83 102787.5, the aforesaid subtraction processing method can correct a deviation in position very quickly compared with the conventional operation processing method.

However, in the aforesaid subtraction processing method, it takes much time (several minutes to several tens of minutes) even for a large computer to conduct the operation for correcting a deviation in position among the radiation images to be subtraction processed even when the approximate rotation operation is employed in combination therewith. Even when a special operation processing unit for correcting a deviation in position is employed, it takes one to three minutes for the operation processing unit to conduct the operation. In order to further increase the operation speed, it is necessary to employ a more roughly approximated rotation operation. In this case, the image quality of the subtraction image is deteriorated compared with the image quality of the subtraction image obtained by using a strict rotation operation. The aforesaid method is practical only when a large computer or a special-purpose. operation processing unit exhibiting high operation speeds. In order to obtain a subtraction image by this method, it is necessary to use a very expensive large computer or a special-purpose operation processing unit having a limited operation function and low flexibility in application. Further, even when such a large computer or a special-purpose operation processing unit is used, it takes a period of one minute or more for the operation to be conducted.

SUMMARY OF THE INVENTION

The primary object of the present invention is to provide a subtraction processing method for radiation images, which provides a subtraction image without using a digital rotation operation conducted by a large computer or a special-purpose operation processing unit.

Another object of the present invention is to provide a subtraction processing method for radiation images, which very quickly provides a subtraction image of high image quality.

The specific object of the present invention is to provide an apparatus for carrying out the method.

The above objects of the present invention are accomplished by a subtraction processing method for radiation images including the steps of recording two or more radiation images on separate stimulable phosphor sheets, at least a part of image information being different among said radiation images, scanning the respective stimulable phosphor sheets with stimulating rays to sequentially release the radiation energy stored in the stimulable phosphor sheets as light emission, photoelectrically detecting the emitted light by a light detecting means to obtain digital image signals of the respective radiation images, and extracting an image of a specific structure contained in at least one of said radiation images by conducting a subtraction processing among said digital data, the subtraction processing method for radiation images comprising:

(i) when each radiation image to be subtraction processed is recorded on each stimulable phosphor sheet, simultaneously recording a marker having such a shape as provides a reference point or a reference line to said stimulable phosphor sheet in a position fixed with respect to said radiation image, (ii) scanning said stimulable phosphor sheet carrying said radiation image stored therein with stimulating rays, and detecting the spatial coordinate of said reference point or said reference line of said marker detected from the light light emitted from said stimulable phosphor sheet, (iii) moving said stimulable phosphor sheet with respect to scanning lines of stimulating rays based on said detected spatial coordinate and adjusting said spatial coordinate to a spatial coordinate predetermined with respect to said scanning lines of stimulating rays, and thereafter (iv) reading out said radiation image.

The term "marker" as used herein means a small area mark discriminable from a radiation image of an object on the stimulable phosphor sheet. Normally, the marker is recorded on the stimulable phosphor sheet in a position fixed with respect to the radiation image by use of a radiation shielding substance secured to the image recording table. In the present invention, at least one marker having such a shape as provides two or more reference points or reference lines is used.

In the present invention, the step of moving the stimulable phosphor sheet with respect to scanning lines of stimulating rays based on the detected spatial coordinate and adjusting the spatial coordinate to a spatial coordinate predetermined with respect to the scanning lines of stimulating rays can be achieved, for example, by moving only the stimulable phosphor sheet by use of guide members, by moving a read-out stage on which the stimulable phosphor sheet is placed, by changing the position of the scanning lines of the stimulating rays for scanning the stimulable phosphor sheet by the optical system, or the like.

Detection of the position coordinate of the marker can be conducted by preliminary read-out for reading out the radiation image stored in the stimulable phosphor sheet prior to final read-out for obtaining a visible image for viewing, particularly diagnostic purposes, as disclosed in U.S. patent application. Ser. No. 434,886 (European Patent Publication No. 77677), or can be simultaneously conducted at the final read-out step.

In the present invention, it is also possible to conduct only the correction of the rotation in the manner as described above, and digitally conduct the correction of the shift by use of the spatial coordinates of the markers detected when carrying out the subtraction among the two or more radiation images.

The present invention can correct the deviation in position very quickly (in a period within the range of 10 to 30 seconds) and still provides a subtraction image of high image quality without digitally conducting the operation for correcting the deviation in position by use of a computer or an operation processing unit.

The subtraction processing method in accordance with the present invention embraces the aforesaid temporal (time difference) subtraction processing, the energy subtraction processing, and a combination of these processings.

In the present invention, in order to improve the signal-to-noise ratio, it is preferable that the stimulable phosphor emits light having a wavelength range not overlapping upon the range of wavelength of the stimulating ray employed to excite the stimulable phosphor. Preferably, when a laser source which emits stimulating ray having a wavelength within the range between 600 nm and 700 nm, such as a He-Ne laser, is used, a stimulable phosphor which emits light having a wavelength within the range between 300 nm and 500 nm should be selected, as disclosed in U.S. Pat. No. 4,258,264.

Further, in order to increase the amount of light read out from the stimulable phosphor and shorten the read-out time, it is preferable to use a gas ion laser source emitting a laser beam having a wavelength range shorter than 600 nm, such as an Ar+ laser beam (488 nm, 514.5 nm), a Kr+ laser beam (520.9 nm, 530.9 nm, 568.2 nm), or an Ar+ —Kr+ laser beam.

As the stimulable phosphor, for example, rare earth activated alkaline earth metal fluorohalide phosphor is preferred. One example of this phosphor is, as shown in DE-OS No. 2,928,245, a phosphor represented by the formula $(Ba_{1-x-y}, Mg_x, Ca_y)FX:aEu^{2+}$ wherein X is at least one of Cl and Br, x and y are numbers satisfying $0 < x+y \leq 0.6$ and $xy \neq 0$, and a is a number satisfying $10^{-6} \leq a \leq 5 \times 10^{-2}$. Another example of this phosphor is, as shown in U.S. Pat. No. 4,239,968, a phosphor represented by the formula $(Ba_{1-x}, M^{II}_x)FX: yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0 \leq x \leq 0.6$, and y is a number satisfying $0 \leq y \leq 0.2$. Further, as the stimulable phosphor to be used in this invention can be used ZnS: Cu,Pb; $BaQ.xAl_2O_3$: Eu wherein $0.8 \leq x \leq 10$; and $M^{II}O.xSiO_2$: A wherein $M^{II}$ is Mg, Ca, Sr, Zn, Cd or Ba, A is Ce, Tb, Eu, Tm, Pb, Tl, Bi or Mn, and x is number satisfying $0.5 \leq x \leq 2.5$, as shown in U.S. Pat. No. 4,236,078. Furthermore, as the stimulable phosphor can be used $LnOX : xA$ wherein Ln is at least one of La, Y, Gd and Lu, X is at least one of Cl and Br, A is at least one of Ce and Tb, x is a number satisfying $0 < x < 0.1$, as shown in U.S. Pat. No. 4,236,078. Among the above enumerated phosphors, the rare earth activated alkaline earth metal fluorohalide phosphor is the most preferable, among which barium fluorohalides are the most preferable in view of the high intensity of emission of light.

Further, barium fluorohalide phosphors added with a metal fluoride as disclosed in Japanese Unexamined Patent Publication Nos. 56(1981)-2385 and 56(1981)-2386, or barium fluorohalide phosphors containing at least one of a metal chloride, a metal bromide and a metal iodide as disclosed in European Patent Publication No. 29,963 are also preferable because of their improved light emitting characteristics.

It is also desirable to color the phosphor layer of the stimulable phosphor sheet made of the above phosphor by use of pigments or dyes to improve the sharpness of the image obtained thereby as disclosed in European Patent Publication No. 21,174.

As for the signal processing, it is possible to employ a frequency processing as disclosed in U.S. Pat. No. 4,315,318 or European Patent Publication No. 31,952, and a gradation processing as disclosed in U.S. Pat. Nos. 4,302,672, 4,276,473 or 4,310,886.

DESCRIPTION OF THE PREFERRED EMBODIMENTS

The present invention will hereinbelow be described in further detail with reference to the accompanying drawings.

Figure 1:
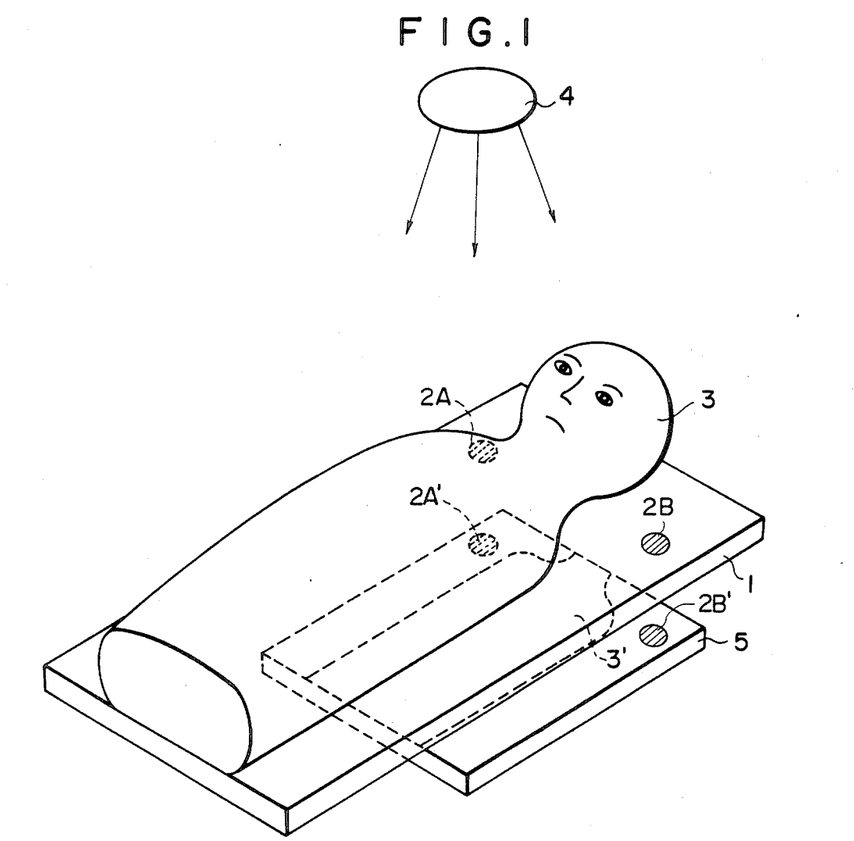
FIG. 1 is a schematic view showing an example of recording of a marker on a stimulable phosphor sheet.

Referring to FIG. 1 showing an example of recording of a marker on a stimulable phosphor sheet, two circular marker forming members 2A and 2B made of a radiation shielding substance are secured to two marginal portions on an image recording table 1. At the radiation image recording step, X-rays are emitted from an X-ray source 4 positioned above the image recording table 1, and the marker forming members 2A and 2B are recorded, together with an object 3, on a stimulable phosphor sheet 5 positioned under the image recording table 1.

Since the marker forming members 2A and 2B secured to the image recording table 1 are recorded on the stimulable phosphor sheet 5 together with the stationary object 3, the relationship between the positions of markers 2A' and 2B' and an object image 3' recorded on the stimulable phosphor sheet 5 does not change even when the recording is repeated by sequentially exchanging the stimulable phosphor sheet 5 with a new stimulable phosphor sheet to conduct a subtraction processing.

Accordingly, when separate stimulable phosphor sheets are sequentially or simultaneously inserted into the image recording table 1 to record different radiation images of the same object 3 on the stimulable phosphor sheets the relationship between the positions of the markers 2A' and 2B' and the object image 3' does not change even if a deviation in position occurs between the radiation images.

A subtraction image is the difference between two different radiation images of the same object. It is possible to obtain a subtraction image of high quality by detecting the positions of the markers recorded on the respective stimulable phosphor sheets 5, moving the stimulable phosphor sheets 5 with respect to scanning lines of the stimulating rays based on the detected spatial coordinates of the markers and adjusting the spatial coordinates of the markers to a spatial coordinate predetermined with respect to the x scanning lines of the stimulating rays, reading out the radiation images, and then carrying out a subtraction processing between the image signals read out from the stimulable phosphor sheets 5.

As the marker, it is necessary to employ one or more markers providing at least two reference points or reference lines in order to correct a rotation and a shift occurring between radiation images.

Methods of detecting the reference points or reference lines by using the marker recorded on the stimulable phosphor sheet will be described below.

Figure 2:
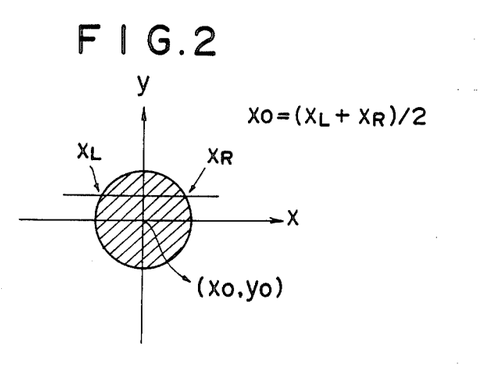
FIGS. 2 to 8 are schematic views showing various markers and the methods of detecting the markers.

When the marker is circular as shown in FIG. 2, the reference point is the central point of the circle. In this case, therefore, it is possible to measure a rotation and a shift occurring between radiation images by using at least two circular markers. In order to detect the reference point, i.e. the central point of the circle from the circular marker, for example, the x coordinates $x_L$ and $x_R$ of the edge of the marker are detected by scanning the stimulable phosphor sheet with stimulating rays (in parallel with the x axis shown in FIG. 2) and detecting the sudden changes in the amount of light emitted from the stimulable phosphor sheet at the edge portion of the marker. The x coordinate (xo) of the reference point can be calculated by $$xo = (x_L + x_R) / 2.$$

This operation is conducted for all scanning lines crossing the circle to increase the number of the xo sample values calculated by the above formula, and the average of all xo sample values is calculated to accurately obtain the x coordinate of the center of the circle. In order to obtain the coordinate of the y coordinate of the center of the circle, for example, scanning may be conducted only in the x direction, thereby to measure the x coordinate of the center of the circle as described above, and the y coordinate of the scanning line on which the absolute value $|x_L - x_R|$ is the maximum (i.e. the diameter of the circle) may be taken as the y coordinate (yo) of the center of the circle. In order to accurately detect the coordinates (xo,yo) of the center of the circle employed as the reference point, 10 or more scanning lines should preferably intersect the circle.

Figure 3:
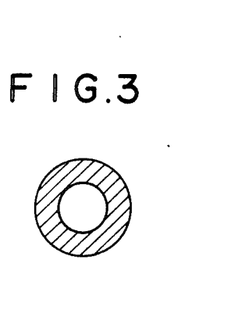
Figures 4, 5, 6, 7, 8:
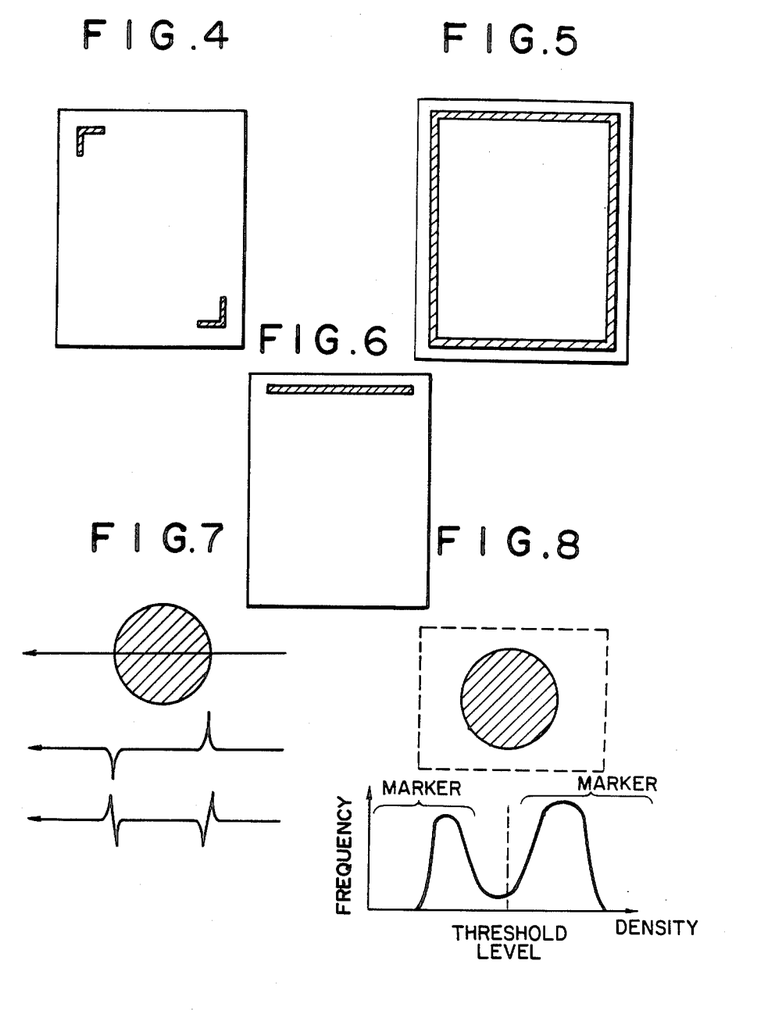

Also for a hollow concentric circle marker as shown in FIG. 3, the center coordinates of the marker can be calculated in the same manner as described above. In this case, since the number of the sample points (i.e. the number of the edge points to be detected) can be increased by conducting the abovementioned procedure both for the outer circle and the inner circle of the marker, it is possible to obtain the center coordinates more accurately. It is also advantageous to employ two L-shaped markers as shown in FIG. 4. In this case, two reference points can be obtained from the two L-shaped markers by detecting the edge points of the markers, obtaining the equations of the straight lines constituting the respective L shapes by the method of least square, and calculating the coordinates of the intersecting points of the straight lines of the respective L shapes. Use of the L-shaped marker is advantageous since, even when only one L-shaped marker is employed, it is possible to obtain one reference point and one reference line. It is also advantageous to employ a frame-like marker extending along four sides of the area exposed by X-ray as shown in FIG. 5. In this case, detection of the edges of the marker is simplified since the marker exists at the marginal portion of the image area. It is also possible to employ one rectangular marker as shown in FIG. 6. One rectangular marker can provide four reference points and two reference lines.

In the present invention, any number of markers may be employed. However, it is advantageous to employ as many markers as possible since it is possible to avoid a failure of obtaining the reference points or reference lines by using some of the markers, for example, when they get out of the image area due to a large shift or a large angle of rotation. Further, the marker setting positions should preferably be spaced apart as far as possible since the distance between the reference points or the reference lines becomes large and an error due to fluctuation in the accuracy of detecting the reference points or the reference lines of the markers becomes small. Although the size of the marker is not limited, it will be selected appropriately so that it does not present an obstacle to the object image to be observed.

For example, when the circular marker shown in FIG. 2 is read out at 5 cycles (i.e. five scanning lines/mm), the diameter of the circular marker should preferably be 2 mm or more. A diameter of the circular marker within the range of 6 mm to 8 mm is sufficient even when the safety factor in edge detection is involved.

In the case of the rectangular marker recorded at the vicinity of the leading end of the stimulable phosphor sheet as shown in FIG. 6, the shorter side of the marker should have a length corresponding to at least 10 scanning lines, and the longer side of the marker should preferably have a length corresponding nearly to the length of one side of the image area are in order to increase as much as possible the distance between two reference points at both ends of the longer side of the marker. For example, when one side of the image area in the direction approximately parallel to the longer side of the marker has the length corresponding to about 2,000 picture elements, the longer side of the marker should preferably have a length corresponding to at least 1,500 picture elements or more. Therefore, in a system which reads out by 5-cycle read-out scanning, the size of the rectangular marker should preferably be 300 mm × 2 mm. Also for other types of the markers shown above etc., the distance between the reference points, or the length of the reference line should preferably be selected as described above.

In the detection of the marker edge, it is not necessarily required to detect all edge points of the marker having the aforesaid size. For example, when the edge points of the marker exist over 100 scanning lines, it is of course possible to detect 10 edge points at 10-line intervals.

As the method of detecting the edge of the marker, the edge can be extracted, for example, by the first order differentiation (this may be for the difference between the adjacent picture elements) or by the second order differentiation as shown in FIG. 7. Since the radiation image portion other than the portion like the edge of the marker artificially provided exhibits relatively small changes in the contrast, the marker edge can be easily discriminated from the other radiation image portion. Further, as shown in FIG. 8, it is also possible to detect the edge of the marker by predetermining a region (surrounded by the dotted line in FIG. 8). A density histogram for this region will be plotted. The histogram has two distinguishable (separable) peaks: the lower peak shows the density distribution for the marker and the higher peak shows the density distribution for the background. Therefore a threshold level which discriminates between the marker and the background will be obtained based on this feature of the histogram. Then by means of the threshold level, the density of the marker will be separated from the density of the background, and the aforesaid first order differentiation, the second order differentiation, or the like will be conducted.

When the marker is recorded in the vicinity of the leading end of the stimulable phosphor sheet, the detection of the marker as described above can be conducted at the beginning of the image read-out (final read-out). Further, it is also possible to conduct the detection of the marker by the aforesaid preliminary read-out. In this case, the marker may be positioned in the vicinity of an end portion other than the leading end of the stimulable phosphor sheet. In order to calculate the degree of the shift or the rotation of the image, which is to be read out, from a reference position corresponding to the reference point or reference line with respect to the read-out apparatus after the marker is detected, it is also possible to use the method as described in the aforesaid European patent application No. 83 102787.5.

After the predetermined reference point or the reference line of the marker is extracted, the spatial coordinate of the reference point or the reference line is detected, and the stimulable phosphor sheet is moved with respect to the scanning lines of the stimulating rays based on the detected spatial coordinate and the spatial coordinate of the marker is adjusted to a spatial coordinate predetermined with respect to the scanning lines of the stimulating rays. The method of moving the stimulable phosphor sheet with respect to the scanning lines of the stimulating rays based on the detected spatial coordinate of the marker and adjusting the spatial coordinate to a spatial coordinate predetermined with respect to the scanning lines of the stimulating rays will be described below.

Figure 9:
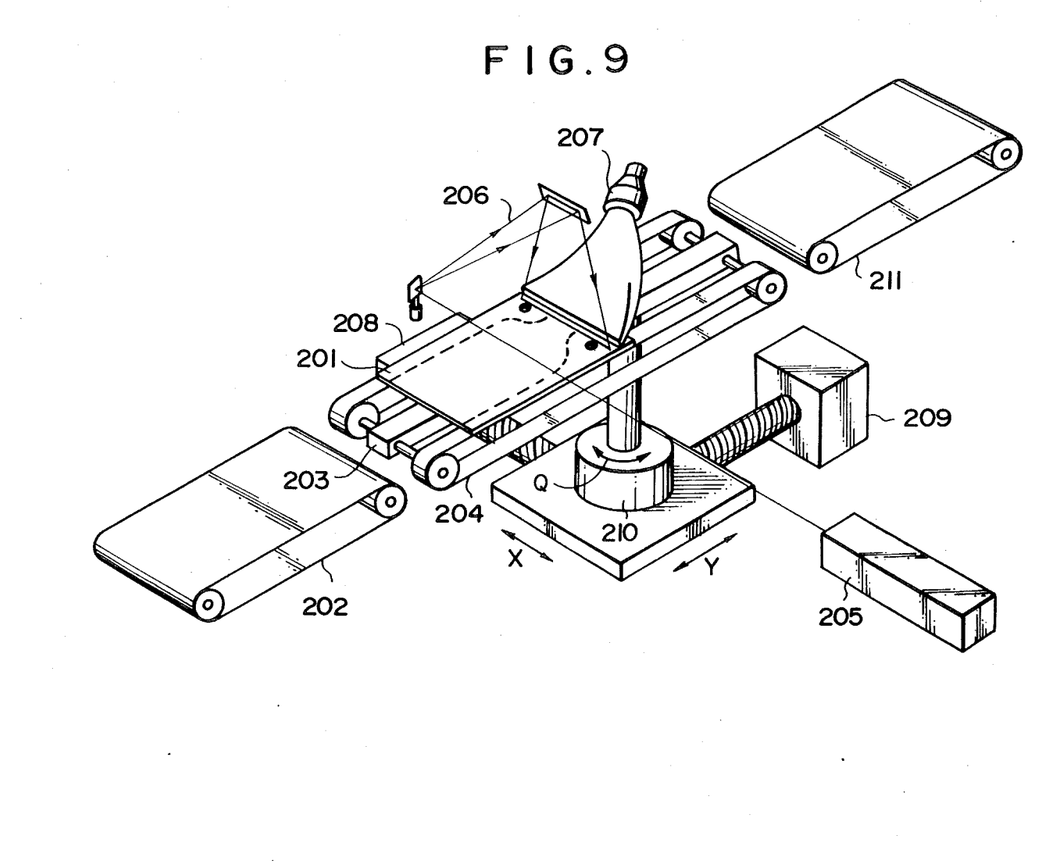
FIGS. 9 to 11 are schematic views showing various embodiments of the radiation image read-out apparatus employed in the present invention.

FIG. 9 shows an embodiment of the read-out apparatus wherein the stimulable phosphor sheet is moved with respect to the scanning lines of stimulating rays by shifting and/or rotating the read-out stage so as to locate the spatial coordinate of the marker in a position predetermined with respect to the scanning lines of the stimulating rays.

In FIG. 9, a stimulable phosphor sheet 201 carrying a radiation image stored therein is placed on a read-out stage 203 by a feed belt 202. The stimulable phosphor sheet 201 placed on the read-out stage 203 is then conveyed by a conveyer belt 204, and the leading end portion of the stimulable phosphor sheet 201 is scanned with stimulating rays 206 emitted from a laser source 205. When the leading end portion of the stimulable phosphor sheet 201 is scanned with the stimulating rays 206, the markers recorded at the leading end portion are read out by a photodetector 207 as light emission. After the markers are read out, the conveyer belt 204 is stopped at once. From the markers thus read out, the spatial coordinates of the reference points provided by the markers are detected by use of a computer in accordance with above described method and the like. Based on the detected spatial coordinates, correction values for shift and rotation with respect to the scanning lines of stimulating rays are calculated. The calculation of these correction values may be conducted by storing the correct spatial coordinates of the markers in a memory and comparing them with the spatial coordinates of the marker read out. Based on the correction values for the shift and the rotation thus calculated, the readout stage 203 is shifted in the directions indicated by the arrows X and Y by use of servo motors 208 and 209, and/or the read-out stage 203 is rotated in the direction indicated by the arrow Q, thereby to locate the spatial coordinates of the markers stored in the stimulable phosphor sheet 201 in a position predetermined with respect to the scanning lines of stimulating rays. After the stimulable phosphor sheet 201 is shifted and/or rotated as described above, it is moved again by the conveyer belt 204 and scanned with the stimulating rays 206 to read out the radiation image stored in the stimulable phosphor sheet 201. The read-out is conducted by photoelectrically detecting the light emitted from the stimulable phosphor sheet 201 during the scanning thereof with the stimulating rays 206 by use of the photodetector 207, A/D converting the image signal thus obtained, and sequentially storing the digitized image signals in a memory. After the read-out is finished, the stimulable phosphor sheet 201 is ejected from the read-out stage 203 by an ejection belt 211. Thereafter, the other radiation image to be subtraction processed is read out from the other stimulable phosphor sheet in the same manner as described above. In the two images corrected for deviations with respect to the scanning lines stimulating rays, deviations between the two images have been already corrected. Experiments conducted on this method showed that it takes about 30 seconds for the correction of deviations to be carried out. After the two radiation images to be subtraction processed are read out as described above, a subtraction processed image having high quality can be obtained simply by conducting the subtraction processing of the image signals of the radiation images to be subtraction processed between the corresponding addresses in the digital memory where the image signals are stored. It should be understood that the subtraction may be carried out according to the formula shown below, thereby to change the linear gradation and raise or lower the density level of the whole image. However, the operation should preferably be carried out after a logarithmic conversion of the image signal of the light emitted from the stimulable phosphor. This is because band compression of the original image signal value is thereby achieved, and complete removal of unnecessary image information becomes possible.

$$Ssub = as1 - bs2 + c$$

wherein Ssub designates the subtraction image signal value, s1 and s2 designate the image signal value of the radiation images to be subtraction processed, c is a constant which corrects the density level, and a and b are the constants (a = b in the temporal (time difference) subtraction, or a and b are coefficients determined according to the absorption factor of the structure to be extracted in the energy subtraction).

By subjecting the subtraction image obtained as described above to various signal processings such as processing of frequency response, gradation processing, arithmetic averaging processing, image size reduction processing and image size enlargement processing, it is possible to obtain a subtraction image having high contrast resolution and high spatial resolution and suitable for viewing, particularly diagnostic purposes. The aforesaid various signal processings may be conducted for the radiation images before the subtraction processing.

The subtraction image obtained as described above is reproduced as a visible image on a recording material such as photographic light-sensitive material, or on a CRT.

Figures 10, 11:
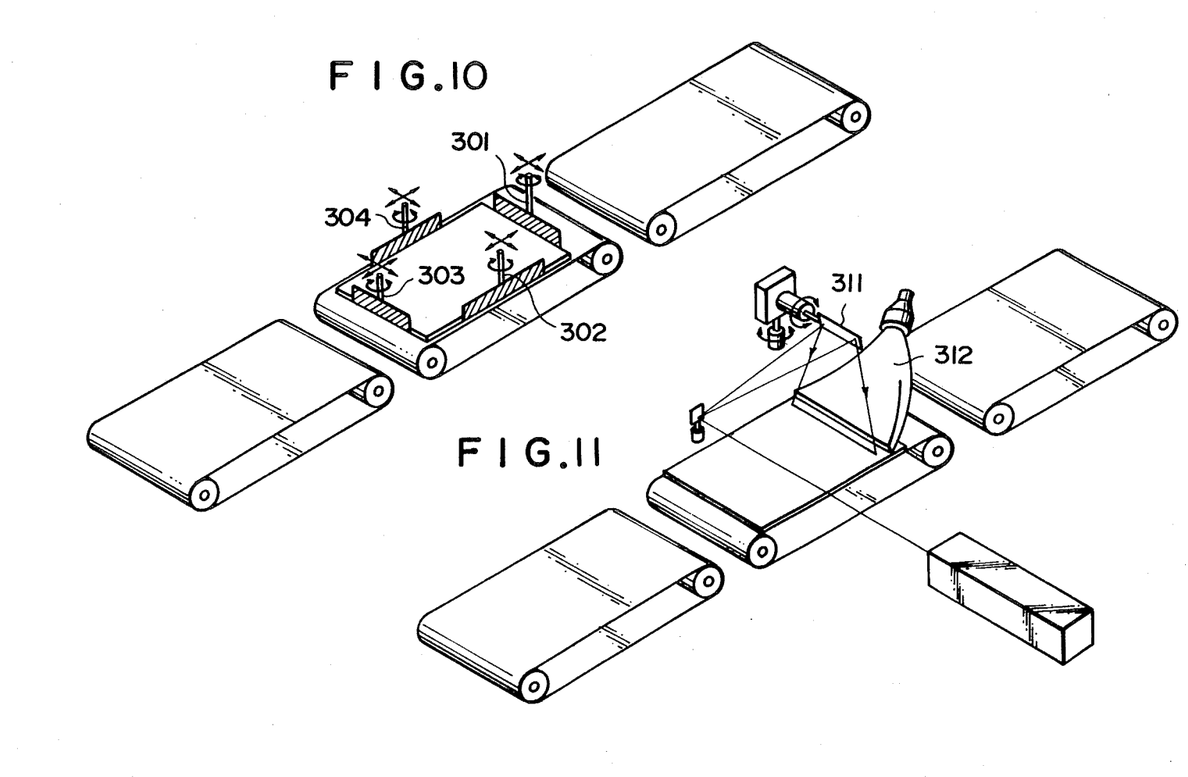

As the method of moving the stimulable phosphor sheet with respect to the scanning lines of stimulating rays so as to locate the spatial coordinates of the markers in a position predetermined with respect to the scanning lines of stimulating rays, it is also possible to move only the stimulable phosphor sheet by moving guide members 301, 302, 303 and 304 as shown in FIG. 10, or to move the scanning lines of stimulating rays by the movement of a part 311 of the scanning optical system as shown in FIG. 11.

In FIG. 10, the guide members 301 and 303 are first moved to correct the shift in the conveying direction of phosphor sheet according to the calculated correction value for shift. Then, the guide members 302 and 304 are moved to correct the shift in the direction perpendicular the conveying direction of the phosphor sheet. Thereafter, the guide members 301 to 304 are moved in synchronization to correct the rotation. There is no limitation to the sequence of the movements of the guides 301 to 304, and both shift and rotation may be corrected at one time by the synchronous movements of the four guides. Each of the guide members 301 to 304 is driven by a servo motor or the like as shown in FIG. 9, can be moved in the conveying direction of the phosphor sheet and the direction perpendicular to the conveying direction of the sheet, and is rotatable around the bar supporting them. Experiments conducted on this method revealed that it takes about 10 seconds for the correction of deviations to be conducted.

In FIG. 11 showing another embodiment of the read-out apparatus employed in the present invention. In this embodiment, an optical scanning system 311 and a photodetector 312 are moved in synchronization according to the deviation correction value. Since the phosphor sheet conveying system need not be moved and there are no guide members nor guide drive system, the read-out apparatus has a relatively simple and compact construction. However, since the optical system such as reflection mirror must be accurately moved and control for moving the optical system must be conducted more strictly, the time required for the correction of deviations to be conducted was 30 seconds, the time which was approximately equal to the time required in the case shown in FIG. 9.

Of course, the aforesaid periods required for the correction of deviations to be conducted include the time required for the mechanical system (the phosphor sheet conveying system shown in FIG. 9, the guide members shown in FIG. 10, or the optical scanning system and the photodetector shown in FIG. 11) moved for the correction of deviations to be returned to the predetermined standard position after the read-out of each stimulable phosphor sheet is finished. The read-out apparatuses described above are also provided with a mechanism for detecting the error in the movement of the mechanical system in the above correction of deviations caused by over-running of the mechanical system due to the intrinsic inertia thereof and further correcting the position of the mechanical system. The aforesaid periods required for the correction of deviations to be conducted also include the time required for the correction of the mechanical system by this mechanism.

While the embodiments of the present invention have been described above for the cases wherein the subtraction image is obtained from two radiation images, a subtraction image can similarly be obtained also from three or more radiation images in accordance with the present invention.

Also, in the above-described embodiments, both correction of the shift and correction of rotation are conducted mechanically. However, it is also possible to conduct only the correction of the rotation in the manner as described above, and conduct digitally the correction of the shift by use of the spatial coordinates of the markers detected when carrying out the subtraction between the two radiation images.

The present invention has been described above with reference to the cases wherein a radiation image is recorded in a stimulable phosphor sheet. However, also when images recorded on X-ray photographic films are optically read out by use of light transmitting through or reflected from the X-ray photographic films, the present invention makes it possible to completely align the positions of the recorded images at the read-out step in the same manner as described above. Namely, this can be achieved by detecting the deviations in positions (shift and rotation) of the recording materials (i.e. the stimulable phosphor sheets as described above, X-ray photographic films, or the like) with respect to a reference position, which occur at the recording step, and providing the read-out system with the same degrees of deviations in positions at the read-out step. Accordingly, when a subtraction processing is conducted among a plurality of images, it is necessary only to conduct the subtraction among the corresponding addresses of a digital memory where the image signals are stored. Further, when there is no rotation among the recording materials (i.e. when a system involving no rotation is used or when no rotation is detected), the images may be read out at a predetermined timing after the read-out of the markers without rotating the recording materials and without moving them in the conveying direction or in the direction perpendicular to the conveying direction at the read-out step. For example, when the marker as shown in FIG. 5 is used and the recording material is scanned with light starting from the upper side of the recording material, as viewed on FIG. 5, detection of the image signals may be started when a period corresponding to a predetermined number of scanning lines has elapsed after the upper horizontal marker line is read out, and also when a predetermined period has elapsed after the left vertical marker line is read out by each scanning line.

Since the images are read out always in the predetermined positional conditions, the present invention provides a large effect of shortening the processing time particularly in the case of subtraction processing. However, the present invention may, of course, be applied also when subtraction is not conducted.

We claim:

1. A subtraction processing method for radiation images including the steps of recording two or more radiation images on separate stimulable phosphor sheets, at least a part of image information being different among said radiation images, scanning the respective stimulable phosphor sheets with stimulating rays to sequentially release the radiation energy stored in the stimulable phosphor sheets as light emission, photoelectrically detecting the emitted light by a light detecting means to obtain digital image signals of the respective radiation images, and extracting an image of a specific structure contained in at least one of said radiation images by conducting a subtraction processing among said digital image signals, the subtraction processing method for radiation images comprising;

(i) when each radiation image to be subtraction processed is recorded on each stimulable phosphor sheet, simultaneously recording a marker having such a shape as provides a reference point or a reference line to said stimulable phosphor sheet in a position fixed with respect to said radiation image, (ii) scanning said stimulable phosphor sheet carrying said radiation image stored therein with stimulating rays, and detecting the spatial coordinate of said reference point or said reference line of said marker detected from the light emitted from said stimulable phosphor sheet, (iii) moving said stimulable phosphor sheet with respect to scanning lines of stimulating rays based on said detected spatial coordinate and adjusting the position of said spatial coordinate to a spatial coordinate predetermined with respect to said scanning lines of stimulating rays, and thereafter, (iv) reading out said radiation image.

2. A method as defined in claim 1 wherein the step of moving said stimulable phosphor sheet with respect to scanning lines of stimulating rays based on said detected spatial coordinate and adjusting the position of said spatial coordinate to a spatial coordinate predetermined with respect to said scanning lines of stimulating rays is conducted by moving only said stimulable phosphor sheet by use of guide members.

3. A method as defined in claim 1 wherein the step of moving said stimulable phosphor sheet with respect to scanning lines of stimulating rays based on said detected spatial coordinate and adjusting the position of said spatial coordinate to a spatial coordinate predetermined with respect to said scanning lines of stimulating rays is conducted by moving a read-out stage on which said stimulable phosphor sheet is placed.

4. A method as defined in claim 1 wherein the step of moving said stimulable phosphor sheet with respect to scanning lines of stimulating rays based on said detected spatial coordinate and adjusting the position of said spatial coordinate to a spatial coordinate predetermined with respect to said scanning lines of stimulating rays is conducted by changing the position of the scanning lines of stimulating rays for scanning said stimulable phosphor sheet by an optical system.

5. A subtraction processing apparatus comprising:
 (i) a means for scanning two or more stimulable phosphor sheets carrying radiation images, wherein at least a part of the image information is different among said radiation images, and markers stored therein with stimulating rays, said markers having such a shape as provides a reference point or a reference line to said stimulable phosphor sheets in a position fixed with respect to said radiation images,
 (ii) means for detecting and photoelectrically converting the light emitted from said stimulable phosphor sheets when said stimulable phosphor sheets are scanned with stimulating rays,
 (iii) means for detecting the spatial coordinates of said reference points or said reference lines of said markers detected from the light emitted from said stimulable phosphor sheets,
 (iv) means for moving said stimulable phosphor sheets with respect to scanning lines of stimulating rays based on said detected spatial coordinates and adjusting the position of said spatial coordinates to a spatial coordinate predetermined with respect to said scanning lines of stimulating rays,
 (v) means for converting the electric signals obtained by scanning said stimulable phosphor sheets with stimulating rays into digital signals, and
 (vi) means for digitally conducting a subtraction processing among said radiation images stored in said two or more stimulable phosphor sheets and obtaining a signal for forming an image of a specific structure contained in at least one of said radiation images.

6. An apparatus as defined in claim 5 wherein said means for moving said stimulable phosphor sheets with respect to scanning lines of stimulating rays based on said detected spatial coordinates and adjusting the position of said spatial coordinates a spatial coordinate predetermined with respect to said scanning lines of stimulating rays comprises a means for moving only said stimulable phosphor sheets by use of guide members.

7. An apparatus as defined in claim 5 wherein said means for moving said stimulable phosphor sheets with respect to scanning lines of stimulating rays based on said detected spatial coordinates and adjusting said spatial coordinates to a spatial coordinate predetermined with respect to said scanning lines of stimulating rays comprises a means for moving a read-out stage on which each stimulable phosphor sheet is placed.

8. An apparatus as defined in claim 5 wherein said means for moving said stimulable phosphor sheets with respect to scanning lines of stimulating rays based on said detected spatial coordinates and adjusting said spatial coordinates to a spatial coordinate predetermined with respect to said scanning lines of stimulating rays comprises a means for changing the position of the scanning lines of stimulating rays for scanning said stimulable phosphor sheets by an optical system.

* * * * *